(12) United States Patent
Mallik et al.

(10) Patent No.: US 9,627,967 B2
(45) Date of Patent: Apr. 18, 2017

(54) POWER MANAGEMENT SYSTEM AND METHOD OF USE THEREOF

(71) Applicant: STMicroelectronics International N.V., Amsterdam (NL)

(72) Inventors: Ranajay Mallik, Ghaziabad (IN); Jitendra Jain, Firozabad (IN)

(73) Assignee: STMicroelectronics International N.V., Amsterdam (NL)

( * ) Notice: Subject to any disclaimer, the term of this patent is extended or adjusted under 35 U.S.C. 154(b) by 431 days.

(21) Appl. No.: 14/222,430

(22) Filed: Mar. 21, 2014

(65) Prior Publication Data

US 2015/0270776 A1 Sep. 24, 2015

(51) Int. Cl.
*H02M 3/156* (2006.01)
*H02M 1/00* (2006.01)

(52) U.S. Cl.
CPC .... *H02M 3/156* (2013.01); *H02M 2001/0025* (2013.01); *Y10T 307/406* (2015.04)

(58) Field of Classification Search
CPC .......... H02M 3/156; H02M 2001/0025; Y10T 307/406
See application file for complete search history.

(56) References Cited

U.S. PATENT DOCUMENTS

| | | | |
|---|---|---|---|
| 5,053,774 A | 10/1991 | Schuermann et al. | |
| 5,982,156 A * | 11/1999 | Weimer | H02M 3/156 307/18 |
| 6,445,168 B2 * | 9/2002 | Eisenhardt | 323/284 |
| 6,593,725 B1 * | 7/2003 | Gallagher | H02M 3/156 323/275 |
| 7,049,794 B2 * | 5/2006 | Wong | H02M 1/32 323/222 |
| 7,345,454 B2 * | 3/2008 | Thrap | H02J 7/345 320/135 |
| 7,412,338 B2 | 8/2008 | Wynans et al. | |
| 8,135,532 B2 | 3/2012 | Heap et al. | |
| 8,358,893 B1 * | 1/2013 | Sanderson | G02B 6/4415 385/100 |
| 8,564,413 B2 | 10/2013 | Wuidart | |
| 2007/0182362 A1 | 8/2007 | Trainor et al. | |
| 2011/0101879 A1 * | 5/2011 | McNay | H05B 41/382 315/247 |
| 2011/0199026 A1 | 8/2011 | Forrest et al. | |
| 2011/0241843 A1 | 10/2011 | Marsanne et al. | |
| 2011/0267068 A1 | 11/2011 | Xu et al. | |
| 2012/0053750 A1 | 3/2012 | Viassolo et al. | |
| 2012/0105012 A1 | 5/2012 | Wuidart | |

(Continued)

*Primary Examiner* — Zeev V Kitov
(74) *Attorney, Agent, or Firm* — Slater Matsil, LLP (57) ABSTRACT

One embodiment of a power management system includes a reservoir configured to collect energy. The system also includes a voltage regulator coupled to the reservoir via an input terminal and configured to convert the energy to an output voltage via an output terminal when enabled. A threshold detector is coupled to the reservoir and is configured to sense the energy and enable the voltage regulator when the energy exceeds a threshold. The system further includes a feedback circuit coupled between the output terminal and the threshold detector, and configured to feedback the output voltage to the threshold detector to compensate for a voltage drop across the threshold detector due to an output current drawn by the load.

29 Claims, 6 Drawing Sheets

(56) References Cited

U.S. PATENT DOCUMENTS

2012/0274144 A1 11/2012 Gasparini et al.
2012/0313588 A1 12/2012 Carberry et al.
2013/0178992 A1 7/2013 De Graeve

* cited by examiner

POWER MANAGEMENT SYSTEM AND METHOD OF USE THEREOF

TECHNICAL FIELD

This invention relates generally to power management and, in specific embodiments, to automatically powering a load in an energy deficient system.

BACKGROUND

Energy harvesting is a process by which energy is captured from external, or environmental, sources. For example, solar power and wind energy are two common energy harvesting schemes. Many other schemes exist with varying success, including thermal energy, kinetic energy, salinity gradients, and electromagnetic (EM) fields. Environmental energy sources typically yield small amounts of power that are well suited for low-energy applications.

Many low-energy applications have non-continuous and, in some cases, periodic power demands. For example, wireless sensor networks can have tens, hundreds, or even thousands of wireless sensor nodes, each of which operates relatively infrequently, as opposed to continuous draw applications. An individual sensor node may update once every hour, or once every minute. In any case, the time period between activities allows the energy harvesting scheme to accumulate sufficient power to operate the sensor node. While energy harvesting is generally a scalable technology, it assumes a minor role in large-scale, continuous draw applications, where battery power and "grid" power dominate.

SUMMARY OF THE INVENTION

An embodiment of a power management system includes a reservoir, a voltage regulator, a threshold detector, and a feedback circuit. The reservoir is configured to collect harvested energy. The voltage regulator is coupled to the reservoir via an input terminal and is configured to convert the harvested energy to an output voltage via an output terminal when enabled. The output terminal is couplable to a load. The threshold detector is coupled to the reservoir. The threshold detector is configured to sense the harvested energy and enable the voltage regulator when the harvested energy exceeds a threshold. The feedback circuit is coupled between the output terminal and the threshold detector. The feedback circuit is configured to feedback the output voltage to the threshold detector to compensate for a voltage drop across the threshold detector due to an output current drawn by the load, thereby maintaining the threshold and further enabling the voltage regulator.

An embodiment of a method of power management includes collecting harvested energy in a reservoir. Then, given a threshold, the method includes detecting when the harvested energy reaches the threshold. A voltage regulator is enabled when the threshold is reached. The method also includes converting the harvested energy to an output voltage. The method further includes feeding back the output voltage through a feedback circuit to maintain the threshold. Then a load is powered for a period of time, after which the voltage regulator is disabled.

An embodiment of a system includes an energy harvesting subsystem, a load, and a power management subsystem coupled between the two. The energy harvesting subsystem is configured to capture energy from an environment source. The load is associated with a power threshold. The power management subsystem includes a reservoir, a voltage regulator, a threshold detector, and a feedback circuit. The reservoir is coupled to the energy harvesting subsystem and is configured to collect the energy it captures. The voltage regulator is coupled to the reservoir via an input terminal and is configured to convert the energy to an output voltage via an output terminal when enabled. The output terminal is coupled to the load. The threshold detector is coupled to the reservoir and is configured to sense the energy and enable the voltage regulator when the energy exceeds a voltage threshold derived from the power threshold. The feedback circuit is coupled between the output terminal and the threshold detector. The feedback circuit is also configured to feed back the output voltage to the threshold detector to compensate for a voltage drop across the threshold detector due to an output current drawn by the load, thereby maintaining the threshold and further enabling the voltage regulator.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

For a more complete understanding of the present disclosure and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

In many low-energy systems, the electrical load cannot be powered directly by a given power source, particularly low-energy systems taking advantage of energy harvesting technology. In these systems, with an incompetent power source, if the electrical load were connected directly to the given power source, the voltage drop across the given power source would make it unstable and otherwise unsuitable for powering the load. In other systems, where a continuous power source is generally available, the systems can operate as low-energy systems when their continuous power source becomes inoperable. This can occur, for example, in a system that has a battery that is discharged, not chargeable, or is otherwise inaccessible. Low-energy systems often have non-continuous power demands, meaning they occasionally require power to carry out a task for a period of time and then power off. The power demands can be periodic or non-periodic. Low-energy systems can carry out a wide variety of tasks, including communication, processing, and sensing, among many others.

Tasks are effectively loads on the power source. It is realized herein that in systems where the power source is incapable of powering a load directly, a power management system can be implemented to distribute the necessary power from a reservoir over the necessary period of time for a given load. It is realized herein that energy can be collected in a reservoir that is monitored by a threshold detector. When the collected energy reaches the threshold, the power management system automatically distributes power to the load for the appropriate period of time, allowing the load to carry out its particular tasks. The power management system can then power off the load, allowing the reservoir to collect additional energy. It is further realized herein that various loads are associated with respective thresholds and voltage demands.

Figure 1:
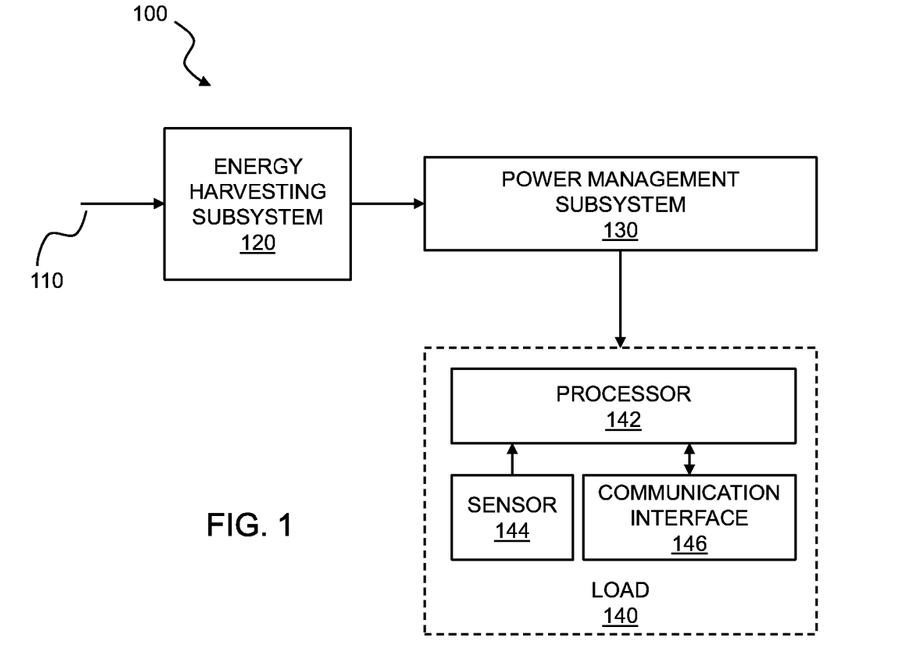
FIG. 1 is a block diagram of a system within which the power management system or method of power management introduced herein may be embodied or carried out.

FIG. 1 is a block diagram of a system 100 within which the power management system or method of power management introduced herein may be embodied or carried out. System 100 includes an energy harvesting subsystem 120, a power management subsystem 130, and a load 140. Energy harvesting subsystem 120 collects energy 110 from an environment energy source, such as the sun or nearby EM fields. Collected energy is stored in power management subsystem 130, which then distributes power to load 140.

Load 140 includes a processor 142, a sensor 144, and a communication interface 146. Load 140 can include any electrical load or circuit. In the embodiment of FIG. 1, load 140 illustrates a possible load for a low-energy wireless sensor. When in operation, or powered, sensor 144 collects data and passes it to processor 142. Processor 142 is configured to package the data collected by sensor 144 and prepare it for transmission through communication interface 146.

Communication interface 146 can transmit and receive data for load 140 and, in particular embodiments, is configured to transmit data collected by sensor 144 toward another device operable to receive the data, and possibly similar data from multiple other low-energy wireless sensors. Communication interface 146 can embody a variety of communication schemes, including wireless schemes such as WiFi or Bluetooth, and wired schemes such as parallel data busses and Ethernet, among others.

In alternative embodiments, load 140 can include a memory for storing data collected by sensor 144. In such embodiments, processor 142 would be configured to gain access to the memory and direct the reading and writing of the data to and from the memory. Sensor 144 can be any type of sensor, including temperature, motion, light, sound, and many others.

Energy 110 can be from any energy source external to system 100. In certain embodiments, energy 110 is solar energy. In other embodiments, energy 110 is RF energy. Other possible external energy sources include wind, thermal, motion, and salinity gradients, among others. Energy harvesting subsystem 120 is largely dependent on the particular type of external energy source providing energy 110. For example, in an embodiment where energy 110 is solar energy, energy harvesting subsystem 120 includes an array of one or more solar cells. Likewise, in an embodiment where energy 110 is RF energy, energy harvesting subsystem 120 includes one or more antenna for gathering EM fields.

Power management subsystem 130 generally controls the storage, monitoring, and delivery, or distribution, of energy collected by energy harvesting subsystem 120.

Having described an example of a system within which the power management system or method of power management introduced herein may be embodied or carried out, several exemplary embodiments of the power management system and method of power management will be described.

Figure 2:
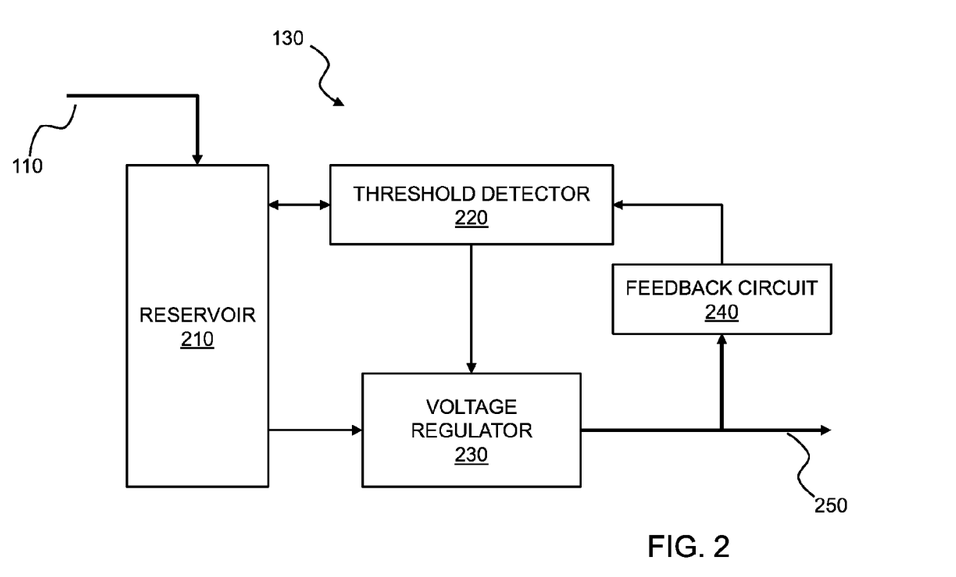
FIG. 2 is a block diagram of one embodiment of a power management system.

FIG. 2 is a block diagram of one embodiment of power management system 130 of FIG. 1. In the embodiment of FIG. 2, power management system 130 includes a reservoir 210, a threshold detector 220, a voltage regulator 230, and a feedback circuit 240. Reservoir 210 stores collected energy 110 for later use. Threshold detector 220 determines when the energy stored in reservoir 210 reaches a given threshold and enables voltage regulator 230, causing it to generate an output voltage 250. Output voltage 250 is used to power a load and is fed back through feedback circuit 240 to threshold detector 220 to maintain the threshold.

Reservoir 210 can be a variety of energy storage devices, such as capacitors, super capacitors, and batteries, and embodiments thereof. The type of energy storage employed in a given embodiment varies with the system's requirements for charging and discharging times and levels, current demands, internal resistance, cost, size, expected life, and many other parameters.

Threshold detector 220 is a circuit configured to detect when the energy stored in reservoir 210 reaches a particular threshold. In certain embodiments, the threshold is specified as a power threshold for a given load. Additionally, the load can also demand a specific voltage level for delivering that power.

Voltage regulator 230 generates output voltage 250 for a period of time. In certain embodiments, the period of time is specified for or associated with a given load. Voltage regulator 230 draws power from reservoir 210 and delivers a constant voltage for the load, in particular, a demanded voltage level for the load. In certain embodiments, voltage regulator 230 includes a boost converter, or step-up converter, which is a DC to DC converter where an output voltage is greater than an input voltage. The step-up in voltage allows voltage regulator 230 to maintain the demanded voltage as the reservoir voltage drops upon connection of the load.

Feedback circuit 240 delivers the demanded voltage back to the threshold detector 220. For example, the feedback voltage can override the voltage sensed by the threshold detector to avoid disabling the voltage regulator 230 in the event of a voltage drop at the reservoir 210. This voltage drop can occur, e.g., when the load draws a high current at start-up. In this manner, the voltage regulator 230 will continue to be powered until the reservoir 210 is no longer able to provide additional energy.

Figure 3:
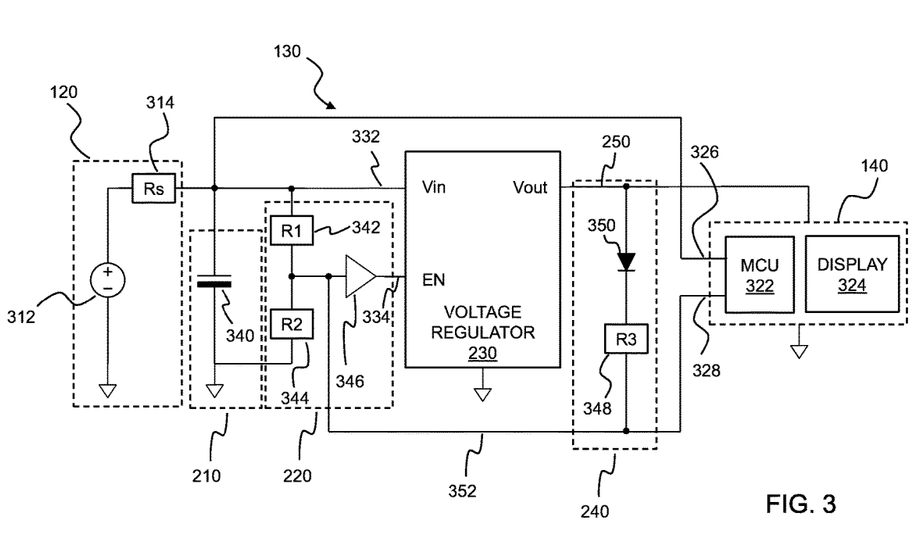
FIG. 3 is schematic of one embodiment of a power management system.

FIG. 3 provides a more detailed illustration of one embodiment of power management system 130 of FIG. 1. In the embodiment of FIG. 3, power management system 130 is coupled to an environmental energy source 120 modeled as a voltage source 312 in series with a very high-impedance 314. Power management system 130 includes a reservoir 210, a threshold detector 220, a voltage regulator 230, and a feedback circuit 240. These elements are coupled to a load 140.

In this embodiment, reservoir 210 comprises a super-capacitor 340 coupled between at an input voltage node 332, and ground. The super-capacitor 340 can, for example, be an electrochemical capacitor, which does not include a conventional solid dielectric. Super-capacitor 332 can be a double-layer capacitor (e.g., with carbon electrodes or derivatives with much higher electrostatic double-layer capacitance than electrochemical pseudocapacitance), a pseudocapacitor (e.g., with metal oxide or conducting polymer electrodes with a high amount of electrochemical pseudocapacitance) and/or a hybrid capacitor (e.g., with asymmetric electrodes one of which exhibits mostly electrostatic and the other mostly electrochemical capacitance, such as lithium-ion capacitors). In other embodiments, a convention capacitor with a solid dielectric could be used as the reservoir 210. The reservoir 210 could also be a battery.

Any voltage present at input voltage node 332 charges super-capacitor 340. Input voltage node 332 is also coupled to environmental energy source 120, threshold detector 220 and voltage regulator 230.

Threshold detector 220 comprises a voltage divider circuit having a first resistance 342 and a second resistance 344. The voltage divider circuit is coupled between input voltage node 332 and ground. An output of the voltage divider circuit, taken between the first resistance 342 and the second resistance 344, is coupled to an input of a comparator 346. Comparator 346 compares the voltage divider output to a fixed voltage threshold built in to comparator 346. When the voltage divider output exceeds the fixed voltage threshold, comparator 346 generates an enable signal 334. In alternate embodiments, threshold detector 220 can include a programmable circuit to adjust the voltage threshold.

Voltage regulator 230 comprises a step-up voltage converter, or boost converter. Voltage regulator 230 includes an enable terminal (EN), a voltage in terminal (Vin), and a voltage out terminal (Vout). The enable terminal is coupled to the output of comparator 346 and receives enable signal 334. The voltage in terminal is coupled to input voltage node 332. When enabled, voltage regulator 230 converts an input voltage present on input voltage node 332 to an output voltage, provided at the voltage out terminal, which is coupled to an output voltage node 250.

In his example, load 140 includes a microcontroller unit (MCU) 322 and a display 324. The display can be used in an electronic shelf label, as described below. In alternative embodiments, display 324 can be substituted for any electrical load, such as a sensor, a memory and/or a communication device, among others.

MCU 322 is an optional component of load 140 and is used to perform the functions of the load. While shown as an MCU, it is understood that any control or processing circuit could be used here. In certain embodiments MCU 322 is coupled to input voltage node 332 and is configured to periodically measure the energy stored in super-capacitor 340. In some embodiments, MCU 322 is also coupled to threshold detector 220, allowing it to disable voltage regulator 230. MCU 322 is configured to disable voltage regulator 230 once it has been enabled and powering load 140 for a period of time.

The period of time can vary with the load and can be pre-determined. For example, in the embodiment of FIG. 3, it may take 500 milliseconds (ms) to update display 324. In that case, MCU 322 can be configured to disable voltage regulator 230 after it has been enabled for 500 ms. MCU 322 can be coupled to threshold detector 220 via a return line 352 that couples at the input terminal of comparator 346. MCU 322 can pull-down return line 352 to ground, bringing the voltage at the comparator below the fixed voltage threshold and disabling voltage regulator 230.

Feedback circuit 240 comprises a diode 350 serially coupled with a third resistance 348. Feedback circuit 240 is coupled between output voltage node 250 and return line 352. Similar to how MCU 322 can pull-down return line 352, feedback circuit 240 can employ the voltage at output voltage node 250 to pull-up return line 352. By pulling-up return line 352, feedback circuit 240 can hold the voltage at the input of comparator 346 above the fixed voltage threshold, thereby keeping voltage regulator 230 enabled. Feedback circuit 240 can keep voltage regulator 230 enabled as long as sufficient charge remains on super-capacitor 340 to power voltage regulator 230. Otherwise, voltage regulator 230 is disabled when the charge on super-capacitor 340 is diminished and feedback circuit 240 can no longer maintain the fixed voltage threshold of comparator 346.

Figure 4:
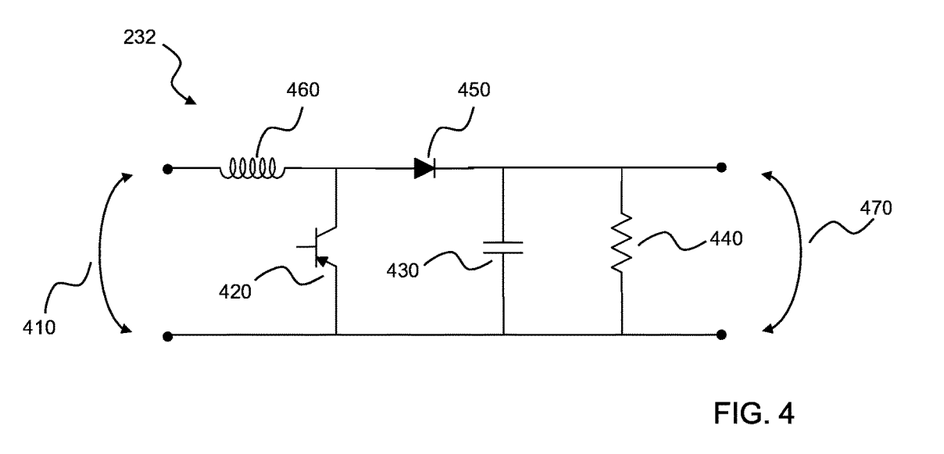
FIG. 4 is a schematic of one embodiment of a voltage regulator circuit.

FIG. 4 is a schematic of one embodiment of a voltage regulator circuit 400. Voltage regulator circuit 400 includes a power switch 420, a capacitor 430, an inductor 460, a diode 450 and a resistor 440. An input voltage 410 is applied to voltage regulator circuit 400. Input voltage 410 can be generated by a power source, such as an energy reservoir, e.g, energy reservoir 210 of FIG. 2. Power switch 420 is a semiconductor switch that cycles on and off, or open and closed, thereby generating an output voltage 470. Capacitor 430 and resistor 440 form a resistance-capacitance (RC) network that has a time constant based on the values of capacitor 430 and resistor 440.

When power switch 420 is closed, diode 450 is inactive and does not conduct. Current flows from source 410 through inductor 460, thereby building up energy in inductor 460. The time constant for the RC network formed by capacitor 430 and resistor 440 is designed according to the on-period of power switch 420. If the time constant is sufficiently larger than the on-period, then output voltage 470 is generally constant, as any charge present on capacitor 430 discharges across resistor 440 according to the time constant, thereby generating output voltage 470.

When power switch 420 is open, current flows through inductor 460, diode 450, and the RC network formed by capacitor 430 and resistor 440. A voltage is generated across capacitor 430 that is larger than the voltage across source 410, and therefore causes output voltage 470 to be larger than that of source 410.

As power switch 420 cycles on and off, energy builds up in inductor 460 and transfers to the RC network where it is delivered as output voltage 470.

Figure 5:
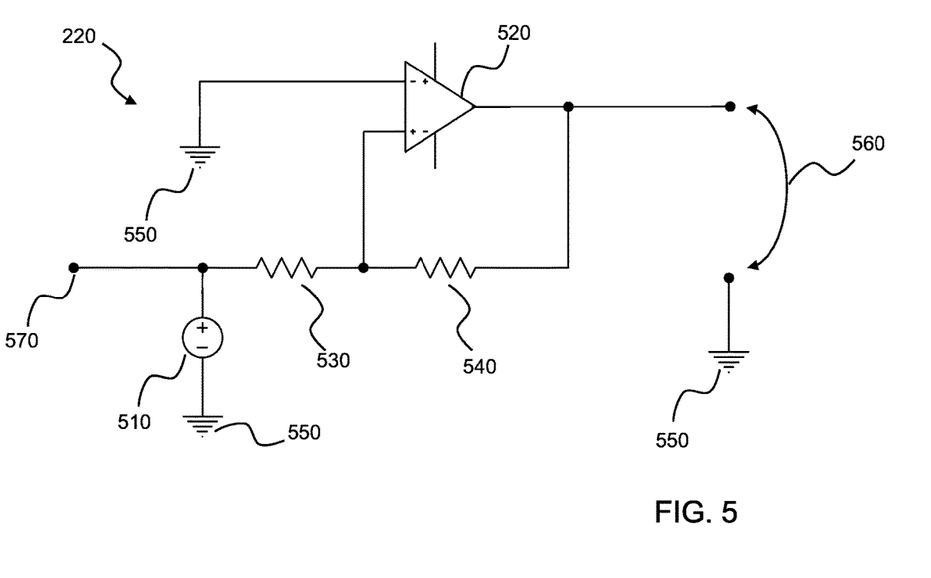
FIG. 5 is a schematic of one embodiment of a threshold detector.

FIG. 5 is a schematic of one embodiment of a threshold detector 500. Threshold detector 500 includes a source 510, an operational amplifier (op-amp) 520, a resistor 530, and a resistor 540. Threshold detector 500 is operable to generate an output voltage 560 with respect to a ground 550 when an input voltage generated by source 510 reaches a threshold. The threshold is specified by selection of resistance values for resistor 530 and resistor 540.

In certain embodiments, a feedback voltage 570 is applied to the input terminal of threshold detector 500, thereby maintaining output voltage 560 when the input voltage across source 510 drops below the threshold. In some embodiments, feedback voltage 570 is generated by output voltage 470 of the voltage regulator circuit embodiment of FIG. 4.

Figure 6:
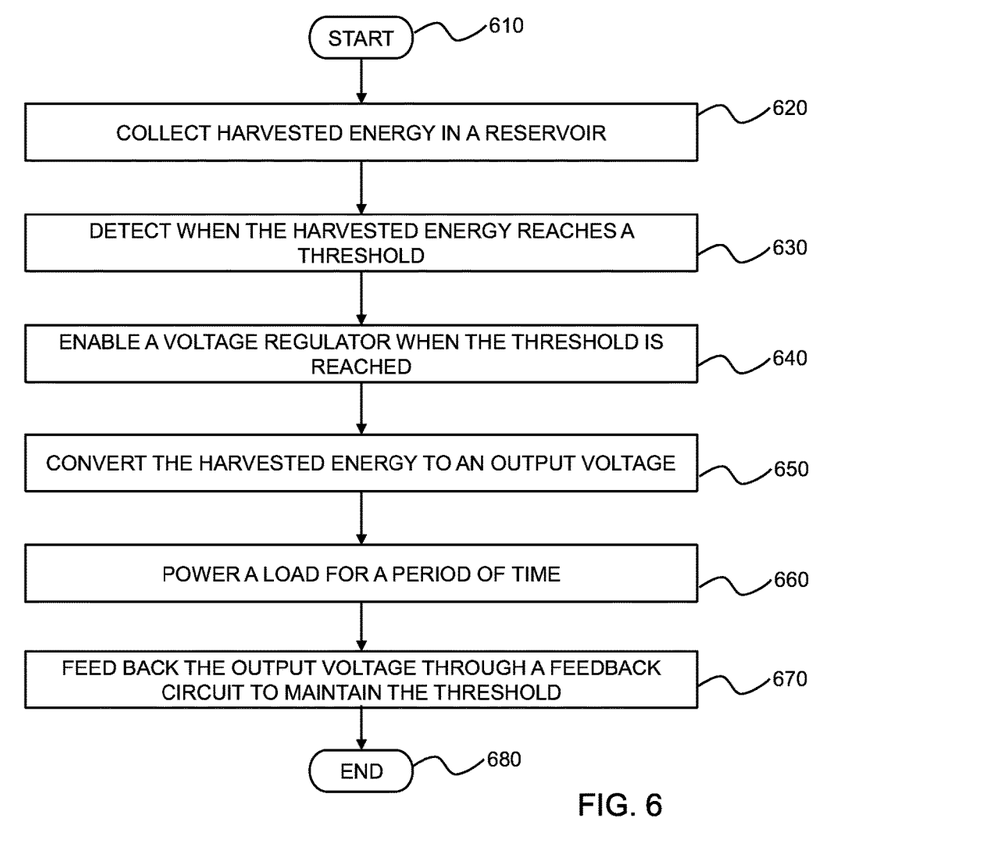
FIG. 6 is a flow diagram of one embodiment of a method of power management.

FIG. 6 is a flow diagram of one embodiment of a method of power management. The method begins at a start step 610. At a collection step 620, harvested energy is collected in a reservoir. The energy can be collected from any source. In certain embodiments, the energy is collected from external power sources through an energy harvesting process. In these embodiments, energy from environmental power sources such as solar energy, wind energy, kinetic energy, EM fields, and others, are captured by an energy harvesting subsystem and delivered to the reservoir, where the energy is stored as electrical energy.

When the amount of harvested energy collected in the reservoir reaches a threshold, the threshold is detected at a detection step 630. The threshold is associated with a load along with a demanded voltage, and can be expressed, in certain embodiments, as a power threshold or a voltage threshold. The threshold and demanded voltage can vary with the load. The power threshold is detected by a threshold detector, which, in certain embodiments, can include a voltage sensing circuit.

When the threshold is reached, a voltage regulator is enabled at an enabling step 640. Once enabled, the voltage regulator converts the harvested energy to an output voltage at a converting step 650. In certain embodiments, the voltage regulation circuit includes a boost converter for stepping-up the voltage from the reservoir to the demanded voltage. At a powering step 660, the output voltage is delivered to the load, thereby powering the load, for a period of time. The period of time the load is powered, in certain embodiments, is associated with the load. The duration of the period can vary with several parameters, including the type of load, time of a previous power cycle, time between power cycles, and others. In certain embodiments, the load can disable the voltage regulator when the load has been powered for an appropriate period of time. Otherwise, the voltage regulator is disabled when there is insufficient charge in the reservoir, thereby powering off the load.

At a feedback step 670, the output voltage is fed back to the threshold detector employed in detection step 630. The feedback effectively holds the voltage at the threshold detector above the threshold. Otherwise, in certain embodiments, the voltage at the threshold detector input would experience a rapid drop upon connection of the load, possibly resulting in a premature powering-off. The method then ends at a step 680.

The circuits of the present invention can be used in a number of embodiments. One such example is an electronic shelf label (ESL), which is a system used by retailers for displaying product pricing on shelves. Typically, electronic display modules, such are module 324 in FIG. 3, are attached to the front edge of retail shelving. These modules use liquid crystal display (LCD) or similar screen technologies to show the current product price to the customer. A communication network allows the price display to be automatically updated whenever a product price is changed.

During operation, an RF communication device is placed near the module to update the display. In this example, an antenna can be used as the energy harvesting mechanism. In response to the antenna receiving a wireless energy burst with wireless electromagnetic energy when the electronic shelf label device is in a powered-down state, the MCU controls the switched mode power relay to power on the e-paper electronic shelf label device from the powered-down state to a powered-up state. The wireless energy burst can further include instructions and data for updating content displayed by the display element. The data transmission can be embedded in the wireless power transmission or use other contact-less techniques such as electromagnetic or optical transmission. Upon the wireless energy burst powering up the e-paper electronic shelf label device to the powered-up state, the MCU controls the display element in accordance with the instructions to display content determined by the data transmitted during the wireless energy burst.

Another application that could utilize aspects of the present invention is an RF ID tag. Radio-frequency identification (RFID) is the wireless non-contact use of radio-frequency electromagnetic fields to transfer data, e.g., for the purpose of automatically identifying and tracking tags attached to objects. The tags contain electronically stored information. These tags are powered by and read at short ranges via electromagnetic fields. As described herein, the RF energy could be harvested from the signal and used to power the reading of a memory and the re-transmission of the contents of this memory.

Other applications of the present invention can be found in the auto-motive field. For example, an energy harvesting system can be used in a vehicle to harvest, store, and use environmental energy. For example, a transducer can be coupled a portion of the vehicle that is subject to mechanical stresses and/or vibrations, for converting the mechanical energy into electric current, which is stored in the reservoir. This transponder can be used, for example as a tire-parameter monitoring sensor. In other examples, the system can be used with electrical energy generated from mechanical energy produced by an individual when he is walking or running, e.g., in fitness applications.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A power management system, comprising:
   a reservoir configured to collect energy;
   a voltage regulator coupled to the reservoir and configured to convert the energy to an output voltage, the voltage regulator including an enable input;
   a threshold detector coupled to the reservoir and the enable input of the voltage regulator, the threshold detector configured to sense the energy and enable the voltage regulator when the energy exceeds a threshold; and
   a feedback circuit comprising a diode and coupled between an output of the voltage regulator and the enable input of the voltage regulator, the feedback circuit configured to feed back the output voltage to override threshold detector when the voltage regulator is operating.

2. The power management system of claim 1, wherein the reservoir comprises a super capacitor.

3. The power management system of claim 1, wherein the voltage regulator comprises a step-up voltage converter circuit.

4. The power management system of claim 1, wherein the threshold is determined according to a load coupled to the output of the voltage regulator.

5. The power management system of claim 1, further comprising an energy harvesting unit coupled to the reservoir.

6. The power management system of claim 1, further comprising a control circuit coupled to the enable input of the voltage regulator to selectively disable the voltage regulator.

7. The power management system of claim 1, further comprising a control circuit coupled to the reservoir and configured to monitor the energy in the reservoir.

8. The power management system of claim 1, wherein the threshold detector comprises:
a voltage divider circuit coupled between the reservoir and a ground terminal; and
a comparator with an input coupled to the voltage divider circuit and an output coupled to the enable input of the voltage regulator.

9. The power management system of claim 1, wherein the feedback circuit further comprises a resistor serially coupled to the diode, the diode having an anode terminal coupled to the output of the voltage regulator and a cathode coupled to the enable input.

10. A wireless component comprising:
an energy harvesting circuit;
a capacitor coupled to the energy harvesting circuit;
a voltage divider coupled in parallel with the capacitor;
a comparator with an input coupled to an intermediate node of the voltage divider;
a voltage regulator having a power input coupled to the capacitor and an enable input coupled to an output of the comparator;
a feedback circuit comprising a diode and coupled between a power output of the voltage regulator and the input of the comparator; and
a load coupled to the power output of the voltage regulator.

11. The component of claim 10, wherein wireless component comprises an electronic shelf label and wherein the load comprises a display.

12. The component of claim 11, wherein the load further comprises a microcontroller unit coupled to the display.

13. The component of claim 10, wherein the feedback circuit comprises a serially coupled diode and resistor coupled between the power output of the voltage regulator and the input of the comparator.

14. A system, comprising:
an energy harvesting subsystem configured to capture energy from an environment source;
a load associated with a power threshold; and
a power management subsystem coupled between the energy harvesting subsystem and the load, the power management subsystem comprising:
a reservoir coupled to the energy harvesting subsystem and configured to collect the energy captured by the energy harvesting subsystem;
a voltage regulator coupled to the reservoir and configured to convert the energy to an output voltage, the voltage regulator including an enable input;
a threshold detector coupled to the reservoir and the enable input of the voltage regulator, the threshold detector configured to sense the energy and enable the voltage regulator when the energy exceeds a threshold; and
a feedback circuit comprising a diode and coupled between an output of the voltage regulator the enable input of the voltage regulator, the feedback circuit configured to feed back the output voltage to override threshold detector when the voltage regulator is operating.

15. The system of claim 14, wherein the load has a periodic power demand.

16. The system of claim 14, wherein the load comprises an electronic paper display.

17. The system of claim 14, wherein the reservoir comprises a super capacitor.

18. The system of claim 14, wherein the voltage regulator comprises a step-up voltage converter circuit.

19. The system of claim 14, wherein the voltage regulator is coupled so as to remain enabled until the reservoir is discharged.

20. The system of claim 14, wherein the load comprises a microcontroller unit coupled to the feedback circuit and configured to selectively disable the voltage regulator.

21. The system of claim 20, wherein the microcontroller unit is configured to monitor the energy in the reservoir.

22. The system of claim 14, wherein the threshold detector comprises:
a voltage divider circuit coupled between the reservoir and a ground terminal; and
a comparator coupled between an intermediate node of the voltage divider circuit and the enable input of the voltage regulator.

23. A power management system, comprising:
means for collecting energy in a reservoir;
means for converting the energy to an output voltage;
means for sensing the energy and enabling the means for converting when the energy exceeds a threshold; and
means for feeding the output voltage back through a diode to the means for sensing to override the means for sensing when the means for converting is operating.

24. The power management system of claim 23, wherein the threshold is determined according to a load coupled to the output of the means for converting.

25. The power management system of claim 23, further comprising means for harvesting the energy to be collected.

26. The power management system of claim 25, wherein the means for harvesting comprises means for harvesting radio frequency (RF) energy.

27. The power management system of claim 23, further comprising means for monitoring the energy in the reservoir.

28. The power management system of claim 23, wherein the means for collecting energy comprises a super capacitor;
wherein the means for converting comprises a step-up voltage converter circuit; and
wherein the means for feeding the output voltage back comprises a serially coupled diode and resistor.

29. The power management system of claim 23, wherein the means for converting comprises:
a voltage divider circuit coupled between the reservoir and a ground terminal; and
a comparator with an input coupled to the voltage divider circuit and an output coupled to an enable input of a voltage regulator.

* * * * *